I. V. BROWER & J. C. HIGGINS.
Walk-Edgers.
No. 144,252.  Patented Nov. 4, 1873.
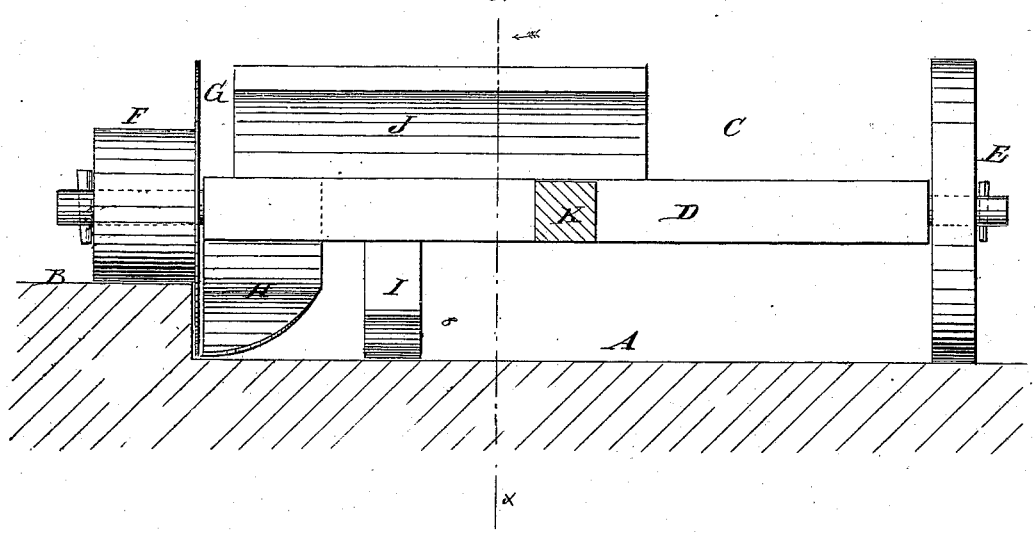
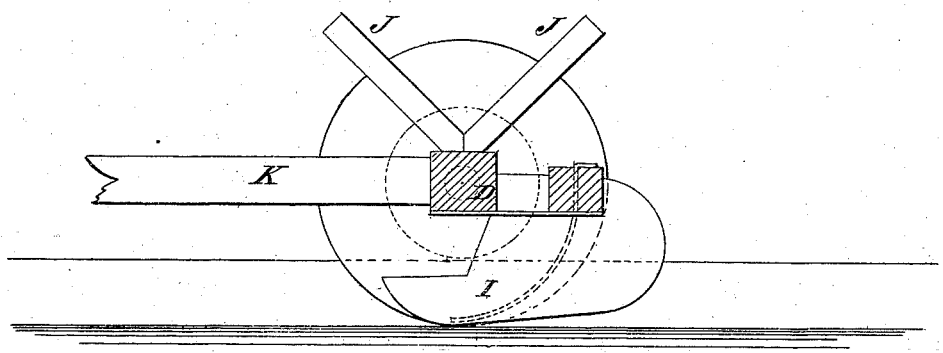
Witnesses:
Inventor:
I. V. Brower
J. C. Higgins
Per
Attorneys.

UNITED STATES PATENT OFFICE.

ISAAC V. BROWER AND JOSEPH C. HIGGINS, OF MILLSTONE, NEW JERSEY.

IMPROVEMENT IN WALK-EDGERS.

Specification forming part of Letters Patent No. 144,252, dated November 4, 1873; application filed July 26, 1873.

*To all whom it may concern:*

Be it known that I, ISAAC V. BROWER and JOSEPH C. HIGGINS, of Millstone, in the county of Somerset and State of New Jersey, have invented a new and useful Improvement in Walk-Edgers, of which the following is a specification:

The object of this invention is to provide convenient means for edging walks in yards and lawns, or cutting turf straight and square for that or other purposes; and it consists in a machine or implement constructed and arranged to operate as hereinafter described.

In the accompanying drawing, Figure 1 shows an elevation of the machine as when in operation. Fig. 2 is a vertical section taken on the line $x$ $x$ of Fig. 1.

Similar letters of reference indicate corresponding parts.

A represents the walk; B, the turf; C, the machine, consisting of an axle, D, at one end of which is an ordinary wheel, E, which runs upon the surface of the walk. At the other end is a wheel or drum, F, which runs upon the turf. G is a circular cutter, made of thin steel, which is attached by bolts to the side of the wheel or drum F. H is a plowshare, made in any suitable form. The plow follows the cutter, and reverses the sod as the latter is cut. The edger may be used either with or without the plow and guide, but we prefer to use it with them. The said beam is connected to the axle by a bolt at one end and by a clevis at the other. I is a gage, attached to the plow-beam for regulating the depth of the plow. J is a box or platform on the axle, for receiving stones or other material as weight to keep the cutter in position. K is the tongue, to which the power is applied.

In many cases this machine may be propelled by hand; but, ordinarily, one or two horses are used, and thills may be substituted for the tongue.

On lawns, parks, gardens, and yards, the turf is cut and the walks edged with a spade, which is a very slow and laborious operation. With this edger the work is performed in the most rapid and perfect manner.

Having thus described our invention, we claim as new and desire to secure by Letters Patent—

The drum F, circular cutter G, plow H, and gage I, arranged near one end of an axle, D, having a wheel, E, at the other end, in the manner and for the purpose described.

ISAAC V. BROWER.
JOSEPH C. HIGGINS.

Witnesses:
THOMAS COOPER,
J. W. VOORHEES.